(12) United States Patent  
Nakata et al.

(10) Patent No.: US 8,576,203 B2  
(45) Date of Patent: Nov. 5, 2013

(54) CORDLESS TYPE POSITION POINTER

(75) Inventors: Takaaki Nakata, Saitama (JP);  
Takenori Kaneda, Tochigi (JP);  
Mamoru Ogata, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 13/164,496

(22) Filed: Jun. 20, 2011

(65) Prior Publication Data

US 2012/0268428 A1 Oct. 25, 2012

(30) Foreign Application Priority Data

Apr. 19, 2011 (JP) ................................. 2011-093547

(51) Int. Cl.  
*G06F 3/03545* (2013.01)

(52) U.S. Cl.  
USPC .......................................... 345/179; 369/126

(58) Field of Classification Search  
USPC ........................................................ 345/179  
See application file for complete search history.

(56) References Cited

U.S. PATENT DOCUMENTS

| | | | | |
|---|---|---|---|---|
| 5,097,768 | A * | 3/1992 | Petrovich ....................... | 102/510 |
| 2009/0008162 | A1 * | 1/2009 | Yang et al. .................. | 178/18.06 |
| 2009/0008163 | A1 * | 1/2009 | Chikazawa et al. ......... | 178/19.01 |
| 2009/0262637 | A1 * | 10/2009 | Badaye et al. ................ | 369/126 |
| 2012/0146957 | A1 * | 6/2012 | Dunagan ...................... | 345/179 |

FOREIGN PATENT DOCUMENTS

| | | |
|---|---|---|
| JP | 57187774 U | 11/1982 |
| JP | 59102384 U | 7/1984 |
| JP | 61177881 U | 11/1986 |
| JP | 05197487 A | 8/1993 |
| JP | 7225645 A | 8/1995 |
| JP | 7225646 A | 8/1995 |
| JP | 10161796 A | 6/1998 |
| JP | 10171579 A | 6/1998 |
| JP | 2000122799 A | 4/2000 |

(Continued)

OTHER PUBLICATIONS

Japanese Office Action dated Jul. 13, 2011, for corresponding JP Application No. 2011-093547, 3 pages.

(Continued)

*Primary Examiner* — Sumati Lefkowitz  
*Assistant Examiner* — Jose Soto Lopez  
(74) *Attorney, Agent, or Firm* — Seed IP Law Group PLLC (57) ABSTRACT

A cordless type position pointer is provided for use with a capacitance type position detection apparatus to carry out a position pointing operation. The position pointer includes a housing having electric conductivity, a projecting portion of a predetermined shape formed at one end portion of the housing and having electric conductivity, and a contacting member removably fitted with the projecting portion. The contacting member has elasticity and electric conductivity, and is configured to contact the position detection apparatus to point to a position. The position pointer further includes a sleeve having a through-hole and configured to expose, when the sleeve is engaged with the housing, a predetermined portion of the contacting member fitted with the projecting portion from the through-hole thereof. The sleeve is configured and arranged so as to prevent application of displacing force in response to a position pointing operation of the position pointer to the fitting portion between the projecting portion and the contacting member in a direction against the major axis of the position pointer, to thereby prevent dislodging of the contacting member from the housing while maintaining removability of the contacting member from the housing.

10 Claims, 7 Drawing Sheets

(56) References Cited

FOREIGN PATENT DOCUMENTS

| KR | 10-0961590 B1 | 6/2010 |
| KR | 10-0984666 B1 | 10/2010 |
| KR | 10-0990755 B1 | 10/2010 |
| KR | 10-0992558 B1 | 11/2010 |
| KR | 10-0994814 B1 | 11/2010 |
| KR | 10-2011-0020667 A | 3/2011 |
| KR | 101027441 B1 | 4/2011 |
| TW | 200903308 A | 1/2009 |
| TW | M379807 A | 5/2010 |

OTHER PUBLICATIONS

Japanese Office Action dated Sep. 7, 2011, for corresponding JP Application No. 2011-093547, 3 pages.
Extended European Search Report, for Corresponding European Application No. 11170853.3, dated Nov. 10, 2011, 4 pages.
Communication pursuant to Article 94(3) EPC issued in corresponding EP Application No. 11 170 853.3, dated Sep. 24, 2012, 3 pages.
Taiwan Office Action issued in corresponding TW Application No. 100124449, dated Jun. 26, 2012, 4 pages.

* cited by examiner

CORDLESS TYPE POSITION POINTER

CROSS-REFERENCE TO RELATED APPLICATION

The present application claims priority under 35 U.S.C. §119(a) of Japanese Application No. 2011-093547, filed Apr. 19, 2011, the entire content of which is incorporated herein by reference.

TECHNICAL FIELD

The present invention relates to a cordless type position pointer used together with a capacitive type position detection apparatus for carrying out a position pointing operation.

BACKGROUND

In recent years, a position detection apparatus of a capacitance type has been vigorously developed as position detection means for a pointer (a finger, a pen type position pointer or the like) used for a touch panel or the like. As the capacitance method, two kinds of methods including a surface capacitive type (Surface Capacitive Type) method and a projected capacitive type (Projected Capacitive Type) method are available, and, in both methods, a variation of a capacitive coupling state between a sensor electrode and a pointer is detected to detect the position of the pointer.

Figure 8:
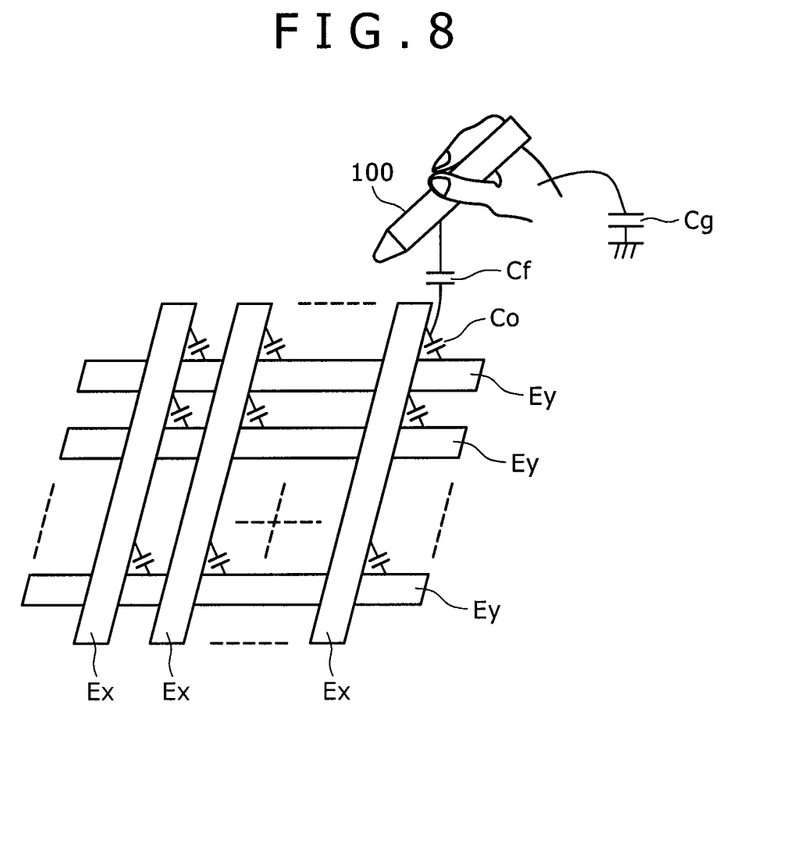
FIG. 8 is a view illustrating an example of a position pointing apparatus, with which the position pointer according to the present invention may be used.

Also, a position detection apparatus has been developed which applies a method called cross-point capacitive coupling method, created by developing the projection type capacitance method. A schematic configuration of a cross-point capacitive coupling type position detection apparatus in the proximity of a sensor section is shown in FIG. 8. An operation principle of the capacitance type position detection apparatus is described using the cross-point capacitive coupling type position detection apparatus as an example.

A sensor section of the position detection apparatus of the cross point capacitive coupling type is configured such that, as shown in FIG. 8, a plurality of upper electrodes Ex and a plurality of lower electrodes Ey are juxtaposed, for example, in an X axis direction (lateral direction) and a Y axis direction (longitudinal direction) on a pointing inputting face such that they extend perpendicularly to each other and are arrayed with a small gap left therebetween. In this instance, a capacitor Co (fixed capacitance) is formed at each of overlapping portions (cross points) between the upper electrodes Ex and the lower electrodes Ey.

Further, at a position of the pointing inputting face, at or near which a pointer 100, such as a position pointer held by a user or a finger or the like of the user, is positioned or contacts the pointing inputting face, a capacitor Cf is formed between the upper and lower electrodes Ex and Ey at the position and the pointer. Still further, the pointer 100 is connected to the ground through a predetermined capacitor Cg via the human body. As a result, the charge transfer amount between the upper electrode Ex and the lower electrode Ey varies at the position of the pointer 100 due to the capacitors Cf and Cg. In the position detection apparatus of the cross point capacitive coupling type, the variation of the charge transfer amount is detected to specify the position pointed to by the pointer 100 on the pointing inputting face.

As a cordless type position pointer used with such a position detection apparatus of the capacitive type as described above, various types of pointers are known as disclosed, for example, in Patent Document 1 (Japanese Patent Laid-Open No. 2000-122799), Patent Document 2 (Japanese Patent Laid-Open No. Hei 10-161796), Patent Document 3 (Japanese Patent Laid-Open No. Hei 7-225646), Patent Document 4 (Japanese Patent Laid-Open No. Hei 10-171579), Patent Document 5 (Japanese Patent Laid-Open No. Hei 7-225645) and so forth.

The position pointers disclosed in Patent Documents 1 to 5 all have a configuration of a pen and include a contacting member, which is made of a conductive material and provided at the tip of a pen. A user of any of these position pointers carries out position pointing by placing the contacting member in contact with a sensor of the position detection apparatus of the capacitive type.

As a result, the contacting member at the end of the pen of the position pointer disclosed in any of Patent Documents 1 to 5 is abraded by contact with the sensor of the position detection apparatus. However, since the contacting member at the end of the pen of the position pointer disposed in any of Patent Documents 1 to 5 is secured to a housing, it is not possible to replace the contacting member by itself, and instead the entire position pointer must be replaced in the case where the contacting member is abraded.

In contrast, in Patent Document 6 (U.S. Published Application No. 2009/0008162 A1) and Patent Document 7 (U.S. Published Application No. 2009/0262637 A1), position pointers are disclosed wherein a contact member is removably mounted. In particular, the position pointer disclosed in either of Patent Document 6 and Patent Document 7 is configured such that a fitting portion for a contacting member is provided on a housing of a position pointer and a contacting member is removably fitted in the fitting portion. Accordingly, with the cited documents 6 and 7, when the contacting member is abraded, only the contacting member may be replaced.

PATENT DOCUMENT

[Patent Document 1]
Japanese Patent Laid-Open No. 2000-122799
[Patent Document 2]
Japanese Patent Laid-Open No. Hei 10-161796
[Patent Document 3]
Japanese Patent Laid-Open No. Hei 7-225646
[Patent Document 4]
Japanese Patent Laid-Open No. Hei 10-171579
[Patent Document 5]
Japanese Patent Laid-Open No. Hei 7-225645
[Patent Document 6]
U.S. Published Application No. 2009/0008162 A1
[Patent Document 7]
U.S. Published Application No. 2009/0262637 A1

SUMMARY OF THE INVENTION

However, since the position pointer of any of Patent Documents 6 and 7 is structured such that the contacting member is merely fitted in the fitting portion of the housing, when the contacting member is brought into contact with the position detection apparatus and operated for position pointing, the displacing force associated with the position pointing operation is applied to the fitting portion between the housing and the contacting member, to thereby dislodge or remove the contacting member from the housing.

According to one aspect of this invention, as a position pointer of a cordless type for carrying out a position pointing operation, which is used together with a position detection apparatus of the capacitance type, a position pointer is provided which can prevent a contacting member from being dislodged from a housing while removability of the contacting member from the housing is maintained.

In accordance with one embodiment, the present invention provides a cordless type position pointer used together with a capacitance type position detection apparatus for carrying out a position pointing operation, comprising:

a housing having electric conductivity;

a projecting portion of a predetermined shape formed at one end portion of the housing and having electric conductivity;

a contacting member removably fitted with the projecting portion, having elasticity and electric conductivity and configured to contact the position detection apparatus to point to a position; and a sleeve having a through-hole and configured to expose, when the sleeve is engaged with the housing, a predetermined portion of the contacting member fitted with the projecting portion from the through-hole thereof, the sleeve being further configured and arranged to prevent application of displacing force in response to a position pointing operation of the position pointer to the fitting portion between the projecting portion and the contacting member in a direction against (transverse to) the major axis of the position pointer.

In the position pointer of the configuration described above, the contacting member is removably fitted in the projecting portion formed at one end portion of the housing. When the sleeve is engaged with the housing, the predetermined portion of the contacting member is exposed through and beyond the through-hole of the sleeve. Furthermore, the sleeve so engaged with the housing prevents application of displacing force in response to a position pointing operation to the fitting portion between the projecting portion and the contacting member in a direction against the major axis of the position pointer. Consequently, it is possible to prevent a situation in which the contacting member is removed from the projecting portion due to the displacing force in response to the position pointing operation being applied in the direction against the major axis of the position pointer.

In accordance with various exemplary embodiments of this invention, a position pointer is provided which can prevent a contacting member from being dislodged from a housing while removability of the contacting member from the housing is maintained.

DETAILED DESCRIPTION

As described hereinabove, the position pointer according to the present invention is a position pointer of the cordless type which carries out a position pointing operation for a position detection apparatus of the capacitive type.

Figure 1A:
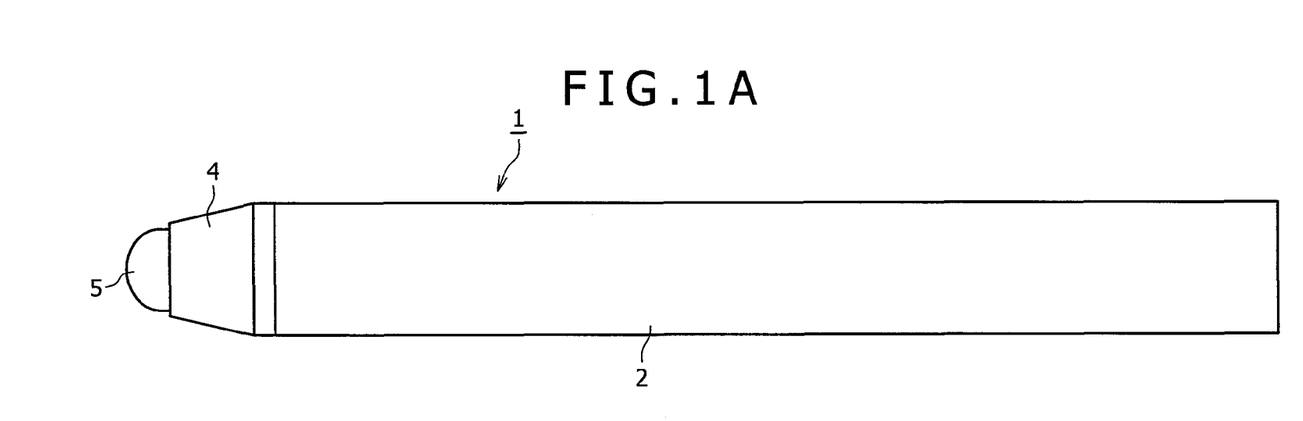
FIGS. 1A and 1B are views illustrating the entirety of an embodiment of a position pointer according to the present invention.
Figure 1B:
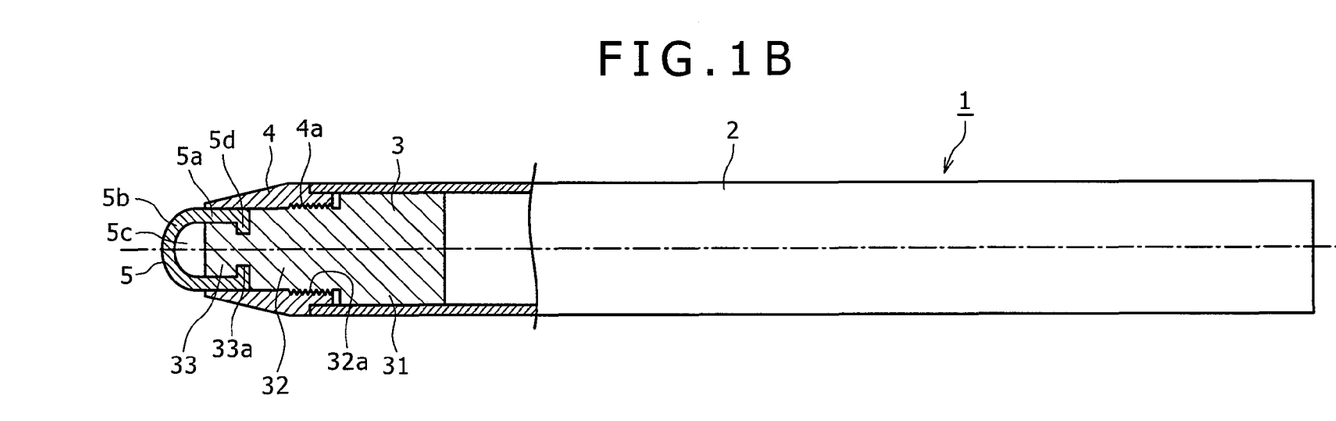

FIGS. 1A and 1B are views illustrating a general configuration of an embodiment of a position pointer 1 according to the present invention, wherein FIG. 1A is a side elevational view showing an appearance of the entire position pointer 1, and FIG. 1B is a partially cross-sectional longitudinal view of the position pointer 1. In the present embodiment, the position pointer 1 is formed such that an appearance thereof has a rod-like stylus shape.

The position pointer 1 of the present embodiment includes a rod-like housing 2. This housing 2 is made of, for example, a metal having conductivity and has a hollow cylindrical shape. In the present embodiment, a cylindrical core body 3 made of a comparatively heavy conductive metal such as, for example, brass is provided in the cylindrical hollow portion on one end side of the rod-like housing 2. This core body 3 is configured from a comparatively heavy conductive metal, and consequently, the position of the center of gravity of the position pointer 1 of the present embodiment is displaced to the one end side on which the core body 3 exists. Accordingly, when the position pointer 1 is used with the one end side, on which the core body 3 exists, as the pen tip side, the position pointer 1 can be used in a stable manner due to the weight of the core body 3.

The core body 3 includes a large diameter portion 31 of a diameter substantially equal to the diameter of the cylindrical hollow portion of the housing 2, a small diameter portion 32 of a diameter smaller than the large diameter portion 31, and a projecting portion 33 with which a contacting member 5 hereinafter described is fitted. The core body 3 is fixed to the housing 2 such that a portion of the large diameter portion 31 thereof is, for example, adhered in the cylindrical hollow portion of the housing 2. The small diameter portion 32 is formed in an elongated manner such that it projects outwardly farther than an end portion on the one end side of the housing 2 from the large diameter portion 31. Also, the small diameter portion 32 has a center line which is aligned with that of the large diameter portion 31. On the small diameter portion 32 on the large diameter portion 31 side in the direction of the center line, a male threaded portion 32a is formed, to which a sleeve 4 hereinafter described is to be screwed.

The projecting portion 33 is a cylindrical portion formed in an elongated manner such that it extends outwardly farther than the small diameter portion 32. The projecting portion 33 has a center line which is aligned with that of the small diameter portion 32. In the present example, the connecting portion between the projecting portion 33 and the small diameter portion 32 is formed as a ring-shaped groove 33a.

A contacting member 5 to be placed in contact with the sensor section of the position detection apparatus when a position pointing operation for the position detection apparatus by the position pointer is carried out is fitted with the projecting portion 33 of the core body 3. The contacting member 5 is a member configured such that, when the position pointer 1 is placed in contact with the position detection sensor, it prevents the pointing inputting face of the position detection sensor from being damaged and also it makes the contacting area with the pointing inputting face greater. The contacting member 5 is made of a conductive elastic member having predetermined elasticity, for example, from conductive rubber.

In the present embodiment, the contacting member 5 has a shape in which a cylindrical portion 5a and a lid portion 5b of a semispherical shape are coupled to each other, and the other end side of the cylindrical portion 5a in the direction of the center line is formed as an opening. Accordingly, the contacting member 5 has a hollow portion 5c in the inside thereof. The outer diameter of the cylindrical portion 5a of the contacting member 5 is selected so as to be substantially equal to the outer diameter of the small diameter portion 32 or a little greater than the outer diameter of the small diameter portion 32.

The contacting member 5 is fitted with the projecting portion 33 such that the projecting portion 33 of the contacting member 5 is inserted into the hollow portion 5c from the opening side. In this instance, a ring-shaped projection 5d which is swollen toward the direction of the center line is provided on an end face of the contacting member 5 on the opening side, and the contacting member 5 is fitted with the projecting portion 33 in such a manner that the ring-shaped projection 5d thereof is provided at the connecting portion of the projecting portion 33 relative to the small diameter portion 32 and is fitted in the groove 33a.

In the state in which the contacting member 5 is fitted with the projecting portion 33, the projecting portion 33 does not occupy the full space of the hollow portion 5c in the inside of the contacting member 5, but the inner side of the spherical lid portion 5b of the contacting member 5 makes a space portion in which the projecting portion 33 does not exist as shown in FIG. 1B. Therefore, when the contacting member 5 is brought into contact with the sensor section of the position detection apparatus, elastic deformation of the contacting member 5 is facilitated by the space portion existing in the hollow portion 5c, and it becomes easy to ensure a sufficient contacting area with the sensor section.

The sleeve 4 is formed from a cylindrical body having a cylindrical through-hole of a diameter equal to the outer diameter of the cylindrical portion 5a of the contacting member 5 or a little smaller than the outer diameter of the cylindrical portion 5a of the contacting member 5, and in the present embodiment, is made of a metal. On one end side of an inner wall face of the through-hole of the sleeve 4, a female threaded portion 4a is formed to be engaged with the male threaded portion 32a provided on the small diameter portion 32 of the core body 3. The sleeve 4 accommodates the contacting member 5 and the small diameter portion 32 therein, which are inserted in the through-hole of the sleeve 4, and the female threaded portion 4a of the sleeve 4 is screwed and fixed onto the male threaded portion 32a of the small diameter portion 32.

In this instance, the length of the sleeve 4 in the direction of the major axis (direction of the center line) of the position pointer 1 is set to a length that can accommodate the cylindrical portion 5a of the contacting member 5 and the small diameter portion 32 of the core body 3 in the through-hole thereof in the state in which the sleeve 4 is fixed to the housing 2, as shown in FIG. 1B. Accordingly, the lid portion 5b of the semispherical shape of the contacting member 5 is placed to project outwardly farther than the end of the sleeve 4.

In this manner, since the diameter of the through-hole of the sleeve 4 is equal to the outer diameter of the cylindrical portion 5a of the contacting member 5 or a little greater than the outer diameter of the small diameter portion 32, in the state in which the sleeve 4 is fixed to the housing 2, the inner wall of the sleeve 4 contacts the cylindrical portion 5a of the contacting member 5. When a position pointing operation is carried out on the sensor section of the position detection apparatus by the position pointer 1, because the contacting member 5 is brought into contact with the sensor section, displacing force from the sensor section is applied to the contacting member 5. However, due to the contacting portion between the sleeve 4 and the cylindrical portion 5a of the contacting member 5, the displacing force is prevented from being applied to the fitting portion between the contacting member 5 and the projecting portion 33, in a direction against the major axis of the position pointer 1. Accordingly, the displacing force from the sensor section in response to a position pointing operation of the position pointer is prevented from being applied to the fitting portion between the contacting member 5 and the projecting portion 33 in a direction against the major axis of the position pointer 1, and the fitting between the contacting member 5 and the projecting portion 33 is maintained.

It is to be noted that, since, in the present embodiment, the contacting member 5 and the projecting portion 33 electrically engage with each other, it is also possible to configure the sleeve 4 from a resin having no conductivity. However, by configuring the sleeve 4 from a metal material which is heavy in comparison with a resin or the like, the position of the center of gravity of the position pointer 1 of the present embodiment is displaced to the one end side on which the contacting member 5 exists. Since, in the present embodiment, also the core body 3 is configured from a comparatively heavy metal material, the position of the center of gravity of the position pointer 1 can be displaced further to the one end side on which the contacting member 5 exists. As a result, when the position pointer 1 is used with the one end side, on which the contacting member 5 exists, as the pen tip side, the position pointer 1 can be used in a stable manner due to the weight and is easy to use.

While the housing in the embodiment described above is configured from a metal, it may be configured from an insulating member of a hollow cylindrical shape made of a synthetic resin, with a conductive coating applied or a conductive sheet adhered to the inner wall face and/or the outer wall face of the hollow cylinder.

While, in the present embodiment, both of the core body 3 and the sleeve 4 are configured from a metal such that the position of the center of gravity of the position pointer 1 in the direction of the major axis (direction of the center line) is displaced to the one end side on which the contacting member 5 exists, it is possible to achieve a similar effect by configuring only one of the core body 3 and the sleeve 4 from a metal while configuring the housing from a synthetic resin. As an example of a case in which the core body 3 is configured from a material other than a metal, for example, the core body 3 may be configured from a material made of a resin while the surface of the core body 3 is coated with a conducting coating or covered with a conductive sheet.

Figure 2A:
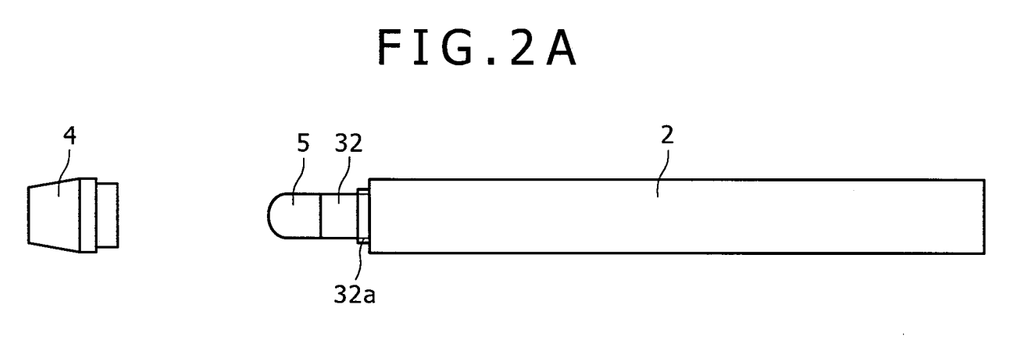
FIGS. 2A and 2B are views illustrating a replacing process of a contacting member in an embodiment of the position pointer according to the present invention.
Figure 2B:
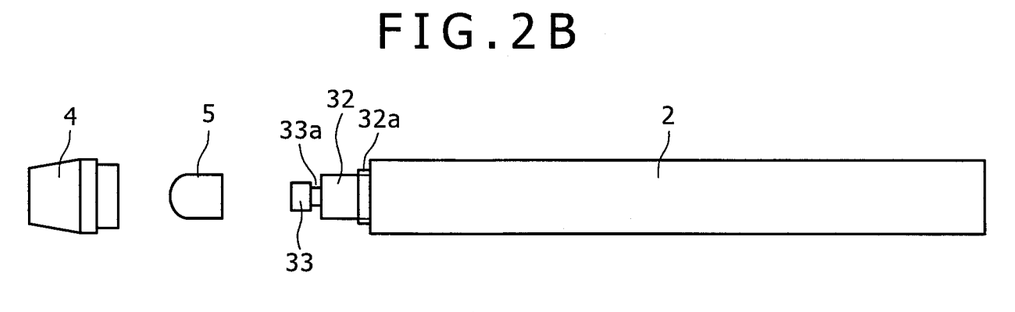

In the position pointer 1 configured in such a manner as described above, when the contacting member 5 is abraded, it is possible to easily replace (exchange) the contacting member 5 in such a manner as illustrated in FIGS. 2A and 2B. In particular, as shown in FIG. 2A, the screwing fastening between the sleeve 4 and the small diameter portion 32 of the core body 3 is first undone to remove the sleeve 4.

Then, the fitting between the contacting member 5 and the projecting portion 33 is undone to remove the contacting member 5 from the projecting portion 33, as shown in FIG. 2B. Then, a new contacting member 5 is fitted with and attached to the projecting portion 33. Then, the sleeve 4 is screwed onto the small diameter portion 32 of the core body 3 and fixed to the core body 3. In this manner, the contacting member 5 can be readily replaced.

[Other Embodiments Or Modifications]

Figure 3A:
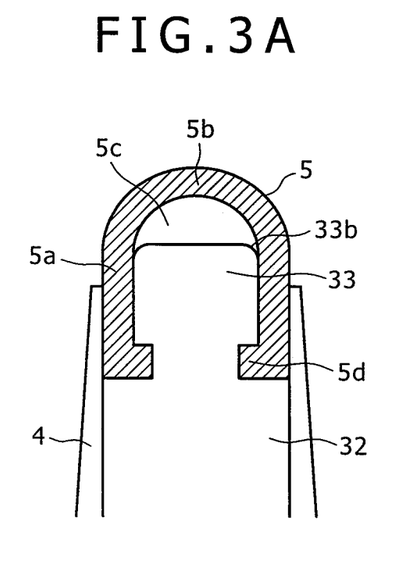
FIGS. 3A-3C are views illustrating different examples of the contacting member in various embodiments of the position pointer according to the present invention.

While, in the embodiment described above, the end of the projecting portion 33 has a cylindrical shape having an angular edge portion, rounding 33b may be provided at an angular edge portion of the end of the projecting portion 33 as shown in FIG. 3A. By this configuration, when the contacting member 5 is brought into contact with the sensor section and is elastically deformed into contact with the angular edge portion of the projecting portion 33, damage to the inner wall of the contacting member 5 can be prevented.

Figure 3B:
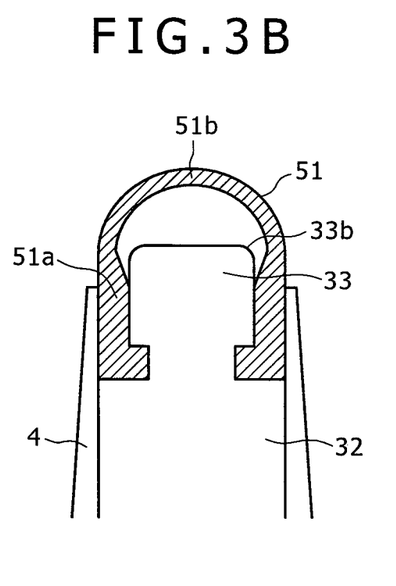

In the embodiment described above, the thicknesses of the cylindrical portion 5a and the semispherical lid portion 5b of the contacting member 5 are made equal to each other as shown in FIG. 1B and FIG. 3A. However, the thickness of the contacting member 5 need not be made uniform. For example, a contacting member 51 of an example of FIG. 3B has a cylindrical portion 51a of a comparatively great thickness similarly to the contacting member 5, but a lid portion 51b of a spherical shape whose thickness is reduced. With the contacting member 51 of the example of FIG. 3B, since the thickness of the spherical lid portion 51b is reduced, which is a portion at which the contacting member 51 contacts the sensor section of the position detection apparatus, there is a merit that the contacting area with the sensor section can be easily increased.

Figure 3C:
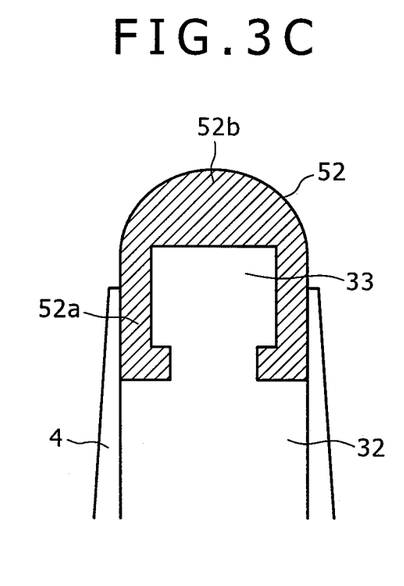

Further, for example, a contacting member 52 of the example of FIG. 3C has a cylindrical portion 52a of a thickness equal to that of the contacting member 5, but a semispherical lid portion 52b thereof has such an internal shape that, when the contacting member 52 is fitted with the projecting portion 33, the hollow space portion described hereinabove may not be formed. In other words, the semispherical lid portion 52b has a shape which does not have a hollow portion in the inside thereof. By this configuration, when the contacting member 5 is brought into contact with the sensor section, a user gains a contact feeling of hard touch.

In the embodiment described above, a through-hole 41a of the sleeve 4 has a cylindrical shape of a uniform diameter, which is equal to the outer diameter of the cylindrical portion 5a of the contacting member 5 or a little smaller than the outer diameter of the cylindrical portion 5a of the contacting member 5. However, the shape of the through-hole 41a of the sleeve 4 is not limited to the cylindrical shape of a uniform diameter but may be any shape as long as it contacts the contacting member 5 to prevent the displacing force from being applied in a direction against the major axis so as to undo the fitting between the contacting member 5 and the projecting portion 33.

Figure 4A:
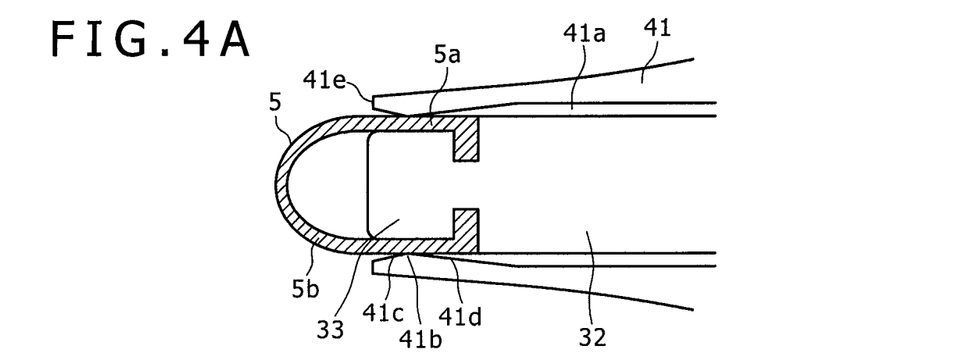
FIGS. 4A-4C are views illustrating different examples of a configuration of a sleeve and the contacting member in various embodiments of the position pointer according to the present invention.

For example, a sleeve 41 shown in FIG. 4A has, at one position of a portion of the inner wall face thereof which opposes the contacting member 5, a projection 41b which projects in a ring shape in the direction toward the center line of the through-hole 41a. This projection 41b may be formed from a first tapering portion 41c which decreases the diameter of the through-hole 41a gradually in a range from an end portion 41e to the position of the projection 41b of the sleeve 41, and a second tapering portion 41d which increases the diameter of the through-hole 41a gradually from the position of the projection 41b as shown in FIG. 4A. Alternatively, the projection 41b may be formed by making the diameter of the through-hole 41a smaller only at the position of the projection 41b than at any other portion.

Figure 4B:
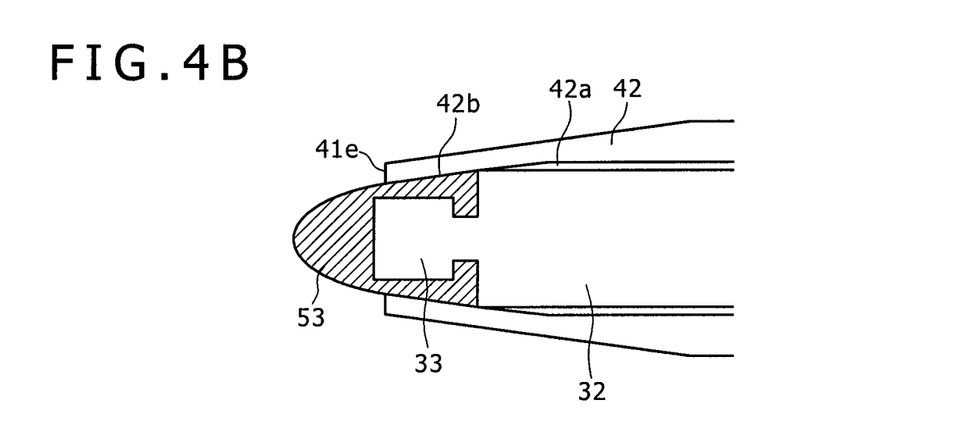

A sleeve 42 of an example of FIG. 4B has a tapering portion 42b which increases the diameter of a through-hole 42a gradually from the end portion 41e thereof The contacting portion 53 of FIG. 4B is shaped such that its outer diameter varies correspondingly to the variation of the diameter of the through-hole 42a of the tapering portion 42b. The configuration of FIG. 4B ensures a secure contact between the contacting portion 53 and the sleeve 42, and application of the displacing force to the fitting portion between the contacting portion 53 and the projecting portion 33 can be surely suppressed.

While, in the example of FIG. 4B, the shape of the contacting portion 53 is a shape corresponding to the shape of the sleeve 42, a similar effect is achieved also when a cylindrical portion 5a of a uniform diameter as in the contacting member 5 described above (see FIG. 4A, for example) is used with the sleeve 42 of FIG. 4B. In particular, as long as at least the end portion of the sleeve 42 on the contacting member 53 side comes into secure contact with the lid portion 5b or the cylindrical portion 5a of the contacting member 5, application of the displacing force to the fitting portion between the contacting member 5 and the projecting portion 33 can be surely suppressed.

Figure 4C:
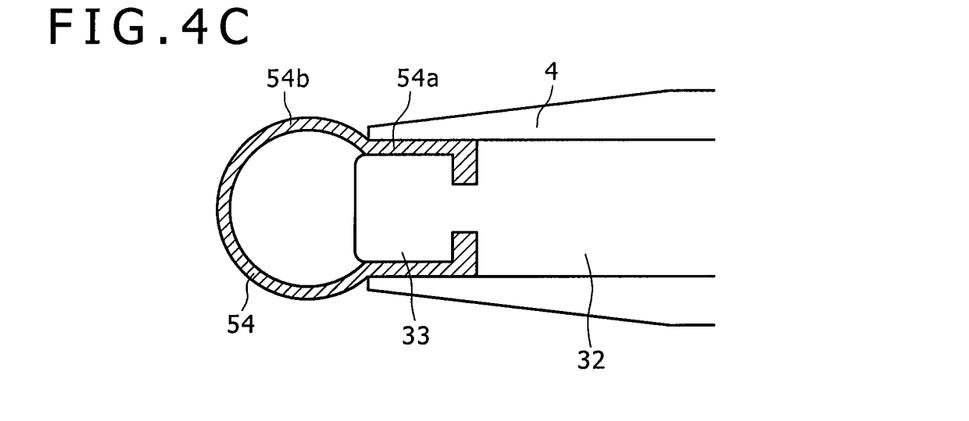

FIG. 4C shows another example of the contacting member. In particular, a contacting member 54 of the example of FIG. 4C is shaped such that a spherical portion 54b continues from a cylindrical portion 54a. In this instance, the diameter of the spherical portion 54b is selected to a value greater than the outer diameter of the cylindrical portion 54a. In the example of FIG. 4C, the inside of the spherical portion 54b is a hollow space and is configured such that, when the contacting member 54 is fitted with the projecting portion 33, the projecting portion 33 is not positioned in the hollow space and the space is maintained.

In the case of the example of FIG. 4C, while the sleeve 4 of the embodiment of FIG. 1B is used, during replacement of the contacting member 54, the contacting member 54 may be deflected (deformed) in the direction toward the hollow space so that it can pass through the inside of the through-hole of the sleeve 4.

Figure 5A:
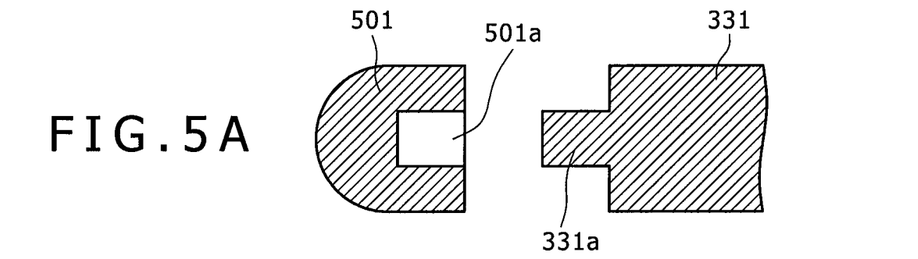
FIGS. 5A-5D are views illustrating different examples of a portion of the position pointer according to various embodiments of the present invention.

The configuration of the shape of the contacting member and the shape of the projecting portion for engagement between the contacting member and the projecting portion is not limited to that described above. In particular, in an example of FIG. 5A, a fitting recessed portion 501a is provided in a contacting member 501, and a fitting projecting portion 331a for fitting with the fitting recessed portion 501a is provided on a projecting portion 331. The fitting projecting portion 331a of the projecting portion 331 is force-fitted into the fitting recessed portion 501a of the contacting member 501 to cause them to fit with each other.

Figure 5B:
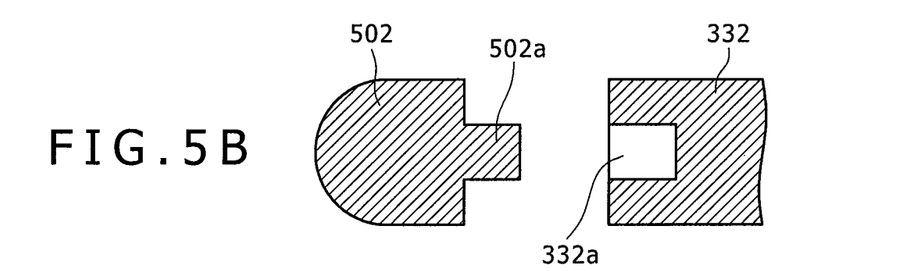

In an example of FIG. 5B, a fitting projecting portion 502a is provided on a contacting member 502, and a fitting recessed portion 332a for fitting with the fitting projecting portion 502a is provided in the projecting portion 332. The fitting projecting portion 502a of the contacting member 502 is force-fitted into the fitting recessed portion 332a of the projecting portion 332 to cause them to fit with each other.

Figure 5C:
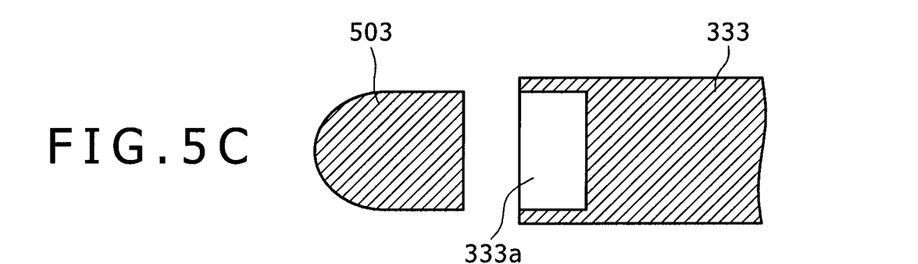

In an example of FIG. 5C, a fitting recessed portion 333a, into which an entire contacting member 503 is fitted, is provided in a projecting portion 333. The entire contacting member 503 is force-fitted into the fitting recessed portion 333a of the projecting portion 333 to cause them to fit with each other.

Figure 5D:
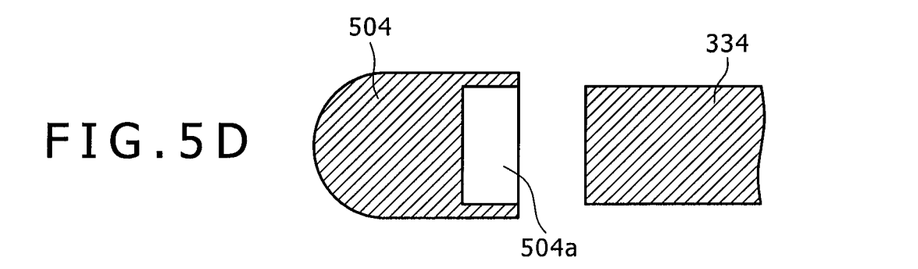

In an example of FIG. 5D, a fitting recessed portion 504a, into which an end portion of a projecting portion 334 is to be fitted, is provided in a contacting member 504. The end portion of the projecting portion 334 is force-fitted into the fitting recessed portion 504a of the contacting member 504 to cause them to fit with each other.

Figure 6A:
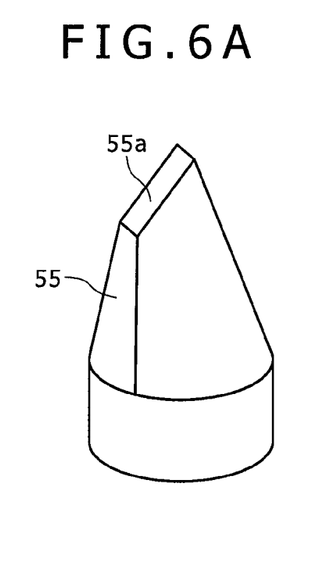
FIGS. 6A and 6B are views illustrating different examples of the contacting member used in various embodiments of the position pointer according to the present invention.
Figure 6B:
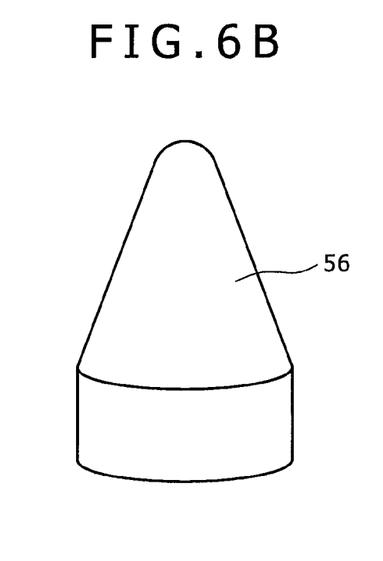

The shape of the contacting member is not limited to the examples described hereinabove. FIGS. 6A and 6B show other examples of the contacting member. In particular, a contacting member 55 of the example of FIG. 6A has a shape similar to that of a pen tip of a felt pen whose tip end 55a is cut obliquely. Meanwhile, a contacting member 56 of an example of FIG. 6B is shaped such that it has a generally conical shape and an end thereof is rounded.

While, in the embodiment described hereinabove, a male threaded portion is provided on the small diameter portion 32 of the core body 3 while a female threaded portion is provided on the sleeve 4, a female threaded portion may be provided on the small diameter portion 32 of the core body 3 while a male threaded portion is formed on the sleeve 4.

Figure 7:
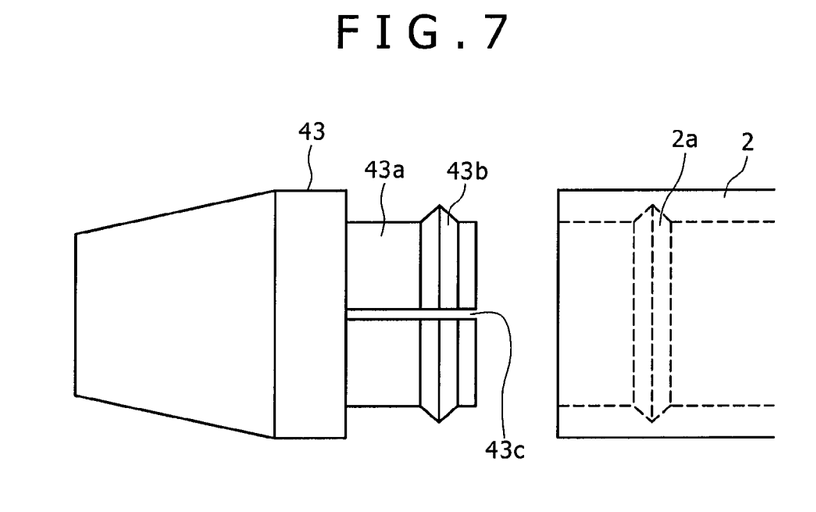
FIG. 7 is a view illustrating another example of a configuration of a fixing method of the sleeve to the housing in an embodiment of the position pointer according to the present invention.

While, in the embodiment described hereinabove, the sleeve 4 is screwed onto the small diameter portion 32 of the core body 3, the fixing method of the sleeve to the housing 2 is not limited to screwing. For example, a sleeve 43 of an example of FIG. 7 includes, at a portion 43a thereof at which the female threaded portion 4a is formed in the case of the sleeve 4 described above, a ring-shaped projection 43b in place of the threaded portion. Further, the sleeve 43 has a slit portion 43c formed therein so as to allow the portion 43a to be elastically deformed in the direction toward the center line.

Meanwhile, a recessed portion 2a, into which the projection 43b of the sleeve 43 is to be fitted, is formed on the inner wall face of the housing 2. With this configuration, when the sleeve 43 is pushed into the housing 2 in the direction of the major axis of the position pointer 1, the projection 43b is fitted into the recessed portion 2a so that the sleeve 43 is locked to the housing 2. Another method of fixing the sleeve to the housing 2 is not limited to the example of FIG. 7, and various other methods are available as should be apparent to one skilled in the art.

While, in the embodiment described hereinabove, the core body 3 as a separate member from the housing 2 is fixed to the housing 2, it is also possible to form the housing 2 and the core body 3 integrally with each other. In other words, the projecting portion may be configured integrally with the housing 2.

It is to be noted that the position detection apparatus, with which the position pointer of the present invention may be used, may be any one of various position detection apparatus used with a portable telephone terminal, a pad type portable apparatus, a personal computer, a tablet terminal, and so forth.

The invention claimed is:

1. A cordless type position pointer used together with a capacitance type position detection apparatus for carrying out a position pointing operation, comprising:
    a housing having electric conductivity;
    a contacting member having elasticity and electric conductivity and configured to contact the position detection apparatus to point to a position;
    a core body having a projecting portion provided on one end side thereof to be removably fitted with said contacting member and fixed at the other end side thereof to said housing having electric conductivity, such that a fitting interface between said contacting member and said projecting portion is exposed from said housing in a state in which said contacting member and said projecting portion are fitted with each other; and
    a sleeve having a through-hole configured such that, when said sleeve is engaged in said position pointer, a distal end portion of said contacting member fitted with said projecting portion is exposed from the sleeve and at least a portion of the fitting interface is enclosed in the sleeve;
    wherein the through-hole of the sleeve is formed in a tapering shape such that a diameter of the through-hole generally increases from a distal end side toward a proximal end side, to ensure a secure fitting between said contacting member and the projecting portion of the core body and to suppress displacement of the contacting member when the sleeve is engaged in said position pointer, and
    wherein said contacting member and said projecting portion are fitted with each other such that one of said contacting member and said projecting portion covers the other of said contacting member and said projecting portion, in a fitting relationship wherein said one includes a projection and said other includes a groove corresponding to said projection, and said contacting member is electrically engaged with said housing through at least one of said core body and said sleeve.

2. The cordless type position pointer according to claim 1, wherein,
    when said contacting member and said projecting portion are fitted with each other, a hollow portion is formed inside of said contacting member so as to apply elasticity to the position pointer.

3. The cordless type position pointer according to claim 1, wherein
    when said contacting member and said projecting portion are fitted with each other, a hollow portion is formed inside of said contacting member so as to apply elasticity to the position pointer, and a peripheral portion of said projecting portion which faces the hollow portion is rounded.

4. The cordless type position pointer according to claim 1, wherein
    said housing is formed of a resin material having electric conductivity.

5. The cordless type position pointer according to claim 1, wherein
    said sleeve is formed of a material having electric conductivity, and said contacting member is electrically engaged with said housing through said sleeve.

6. The cordless type position pointer according to claim 1, wherein
    at least one of said projecting portion and said sleeve is formed of a metal so that the center of gravity of said position pointer is displaced to the contacting member side in the direction of a major axis of the position pointer.

7. The cordless type position pointer according to claim 1, wherein
    said core body is formed of a material having electric conductivity, and said contacting member is electrically engaged with said housing through said core body.

8. The cordless type position pointer according to claim 7, wherein
    said core body and said projecting portion are each formed of a material having electric conductivity, and said contacting member is electrically engaged with said housing through said projecting portion and said core body.

9. The cordless type position pointer according to claim 1, wherein
    said sleeve is engaged in the position pointer based on fixation of said sleeve to said core body.

10. The cordless type position pointer according to claim 1, wherein said sleeve is engaged in the position pointer based on fixation of said sleeve to said housing.

* * * * *